United States Patent
Leahy et al.

[15] 3,701,413
[45] Oct. 31, 1972

[54] ROLLER FLIGHT CONVEYOR CHAIN

[72] Inventors: James B. Leahy, Farmington; Robert B. Pierson, Orchard Lake, both of Mich.

[73] Assignee: Rex Chainbelt Inc., Milwaukee, Wis.

[22] Filed: Sept. 14, 1970

[21] Appl. No.: 71,823

[52] U.S. Cl. ............................................. 198/183
[51] Int. Cl. ............................................. B65g 17/24
[58] Field of Search ........ 198/127, 183, 189; 193/35, 193/37

[56] References Cited

UNITED STATES PATENTS 3,225,901   12/1965   Heinisch ............. 198/189 X
3,503,490   3/1970   Heyne .................. 198/183

FOREIGN PATENTS OR APPLICATIONS 1,574,132   6/1969   France .................. 198/189

Primary Examiner—Edward A. Sroka
Attorney—Ernst W. Schultz and Joseph J. Jochman, Jr.

[57] ABSTRACT

A roller flight conveyor includes conventional hexagonal shaft rolls mounted between a pair of carrier roller chains. The roller chain pins are provided with hexagonal bores to receive and provide mounting for the roll shaft ends and to secure the shafts against rotation.

3 Claims, 4 Drawing Figures

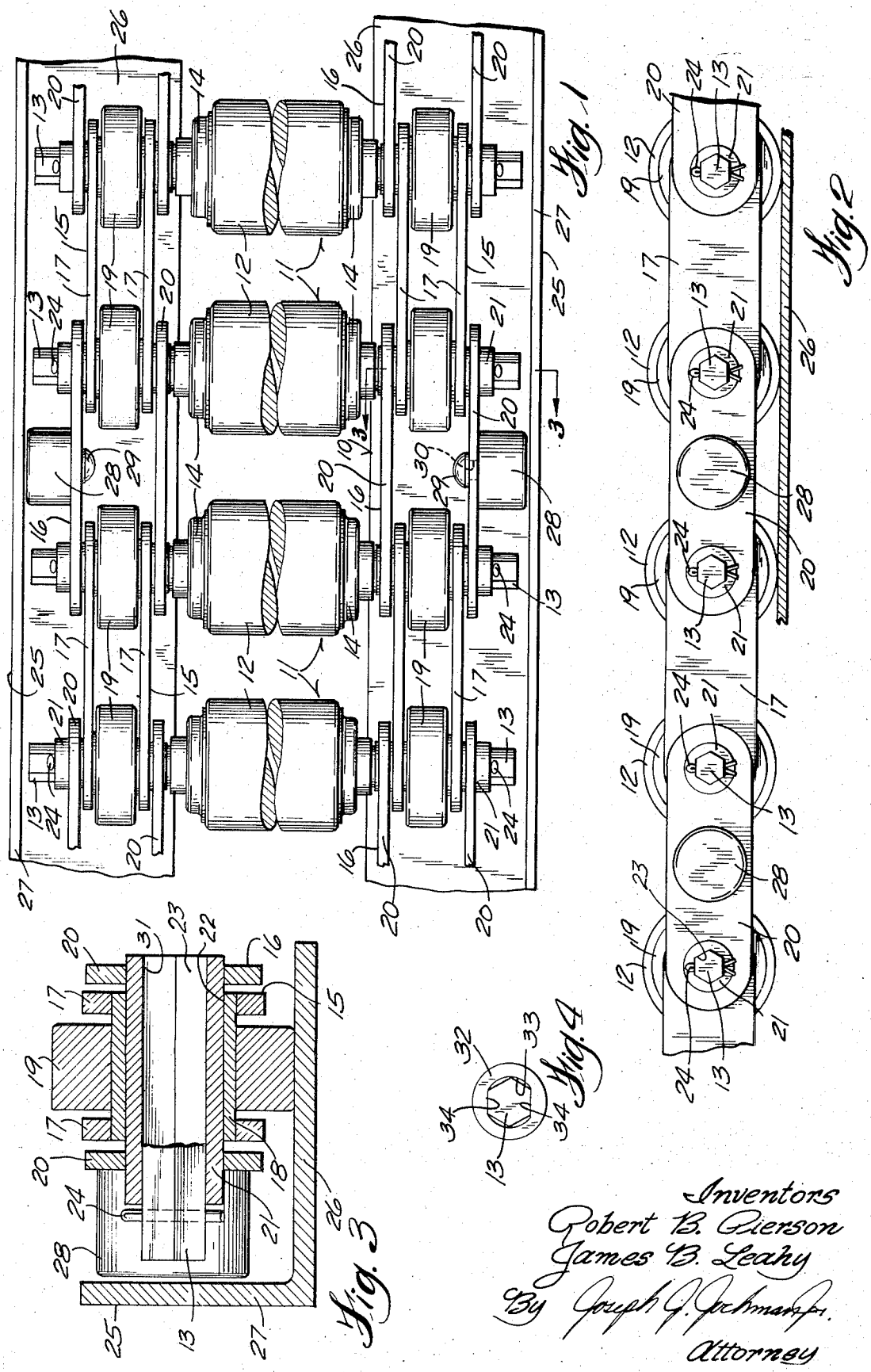

ROLLER FLIGHT CONVEYOR CHAIN

BACKGROUND OF THE INVENTION

1. Field of the Invention

The present invention pertains to roller flight accumulating conveyors in which the conveying surface is composed of a series of idler rolls attached to a pair of moving carrier chains and, in particular, to an improved means for mounting the rolls to the carrier chains.

2. Description of the Prior Art

Roller flight conveyors are well known in the art and have found application in conveying a wide variety of items of varying sizes and weights. In nearly all applications, the purpose of using roller flights is to enable the objects being conveyed to be stopped and accumulated without stopping the conveyor. This is particularly desireable and advantageous on a conveyor line in which material handling or processing requires frequent stops. As the material being conveyed is stopped, the carrying chains and attached idler roll flights continue to advance under the accumulated material. The freely turning rolls keep line pressure resulting from the accumulation at a minimum.

In a commonly used type of roller flight conveyor, the carrier chains are a pair of standard conveyor roller chains and the rolls are also of the standard type employing hexagonal shafts. However, in order to mount standard hex-shaft rolls to standard carrier chains, substantial modifications or special attachments must be made to one or both of the components.

In one type of roller flight conveyor, hexagonal holes are formed in the sidebars of the carrier chain to receive the hexagonal roll shafts. Similarly, special rolls with non-standard round shafts may be used with chains provided with round holes in the sidebars, as shown, for example, in U.S. Pat. No. 3,381,798. In either case, specially made sprockets with gaps to provide clearance for the mid-pitch location of the roll shafts are required.

Another manner of constructing a roller flight conveyor involves turning the hexagonal roll shafts round and using the round shaft ends as connecting pins of the carrier chain; see, for example, U.S. Pat. No. 2,829,762. The turned down shaft ends must be subsequently hardened for adequate wear resistance and strength, all of which results in substantial expense. In addition, replacement of any part of the conveyor is extremely difficult and costly.

Hollow pin chains are well known in the conveyor art and provide carrier chains for yet another type of roller flight conveyor. In this type of conveyor the roll shafts are inserted in the bores of the hollow carrier chain pins and suitably secured in place. The disadvantages of this design primarily concern the need for round roll shaft ends; this necessitates non-standard shafts turned down for insertion in the round bores of the pins. Lack of availability and high fabrication costs make these applications employing hollow pin carrier chains undesirable.

Special attachments, either integral with or secured to the sidebars of the carrier chains, may also be provided to receive and secure the roll shaft ends. The principal and most obvious disadvantage of using a attachments is the increase in cost in manufacture and/or assembly of the special carrier chain. See, for example, U.S. Pat. No. 2,449,611.

SUMMARY OF THE INVENTION

In the present invention, hollow pins of standard carrier chains are provided with hexagonal through bores. The bores are dimensioned to accept the standard sizes of hexagonal shafts provided by the manufacturers of the rolls used as flights.

The principal advantages of the chain disclosed herein arise from the elimination of costly manufacturing or pre-assembly operations on the sidebars of the carrier chains or the shafts of the roll flights, respectively. The hexagonal bores in the pins for the carrier chain of the present invention, on the other hand, are provided by a simple and relatively inexpensive broaching operation on standard pins with circular bores. No further modifications whatever are required to the chain or the rolls.

In addition, the hexagonal shaft-receiving pin bores inherently prevent roll shaft rotation, thereby eliminating the need for special stops required for round shafts or for turned down hexagonal shaft ends. The load imposed on the roll flights in operation is transmitted directly to the chain carrier rolls, thereby eliminating one source of heavy bending stresses in the carrier chain sidebars or link plates. Further, the absence of any mid-pitch obstructions, such as are present in conveyors in which the rolls are attached to the sidebars or associated attachments, eliminates the need for special sprockets.

BRIEF DESCRIPTION OF THE DRAWING

FIG. 1 is a top plan view of an intermediate section of a roller flight conveyor of the present invention.

FIG. 2 is a side elevation view of the section of the conveyor shown in FIG. 1.

FIG. 3 is a lateral sectional view through one of the carrier chains taken on line 3—3 of FIG. 1.

FIG. 4 is an enlarged end view of a pin showing an alternate embodiment of the invention.

DESCRIPTION OF THE PREFERRED EMBODIMENT

Referring to the drawing, FIG. 1 shows a portion of a roller flight conveyor comprising a pair of identical spaced carrier chains 10 interconnected at selected intervals by a series of cylindrical rolls 11. The carrier chains 10 are basically standard conveyor chains adapted to operate about coaxially mounted pairs of head and tail sprockets, the former, driving the chains, all in a well known manner. The cylindrical rolls 11, which provide the flights of the conveyor, are also of a conventional construction and include a cylindrical roll shell 12 rotatably mounted on a solid hexagonal shaft 13 by means of a pair of bearings 14 which close the respective ends of the roll shell 12.

Each carrier chain 10 comprises alternate interconnected roller links 15 and pin links 16. Each roller link 15 includes a pair of roller link sidebars or plates 17 interconnected by a pair of bushings 18 press-fitted into the plates 17. A roller 19 is rotatably mounted on each bushing 18. The rollers 19 are preferably of a large diamenter to provide the carrying function of the chain 10 as will be described in more detail below.

Each pin link 16 includes a pair of pin link plates 20 or sidebars interconnected by a pair of pivot pins 21. The pins 21 are rotatably received in the bores 22 of the bushings 18 of adjacent rollers links 15 for assembly of the chain. The pins 21 are press-fitted into appropriately provided holes in the pin link plates 20.

The pins 21 are provided with through bores 23 having hexagonal cross sections. The hexagonal bores 23 provide a slip fit for the insertion of the ends of the conventional hexagonal shafts 13 of the rolls 11. The hexagonal bores 23 may be conveniently formed by a broaching operation performed on cylindrically-bored pins. It has been found that broaching or otherwise forming the hexagonal bores to a size approximately 1/64 inch larger than the size of the roll shafts 13 provides adequate clearance for receipt of the shafts.

To assemble the conveyor, the ends of the shaft 13 of each roll are simply inserted in the axially aligned hexagonal bores of a pin 21 of each of the carrier chains 10. The shaft ends are preferably long enough to extend through the bores 23 of the pins 21, such that the ends may be secured therein, as with cotter pins 24 or other suitable means. A roll may thus be rapidly demounted and replaced by the removal of two cotter pins.

In operation, the carrier chains 10 travel along and are supported by a pair of spaced parallel tracks or guides 25 which form a portion of the conveyor supporting structure (not shown). The guides 25 are preferably structural angles and are disposed such that the large diameter rollers 19 of the carrier chains travel over the inner surface of a horizontally disposed leg 26 thereof. The vertically disposed legs 27 of the guides serve to maintain the alignment of the conveyor by preventing lateral movement of the carrier chains. To prevent wear and possible distortion of the shaft ends which would otherwise engage the vertical legs 27, the pin link plates 20 on the outside of each carrier chain may be provided with wear buttons 28. The buttons may be attached to the sidebars or plates 20 in any suitable manner, such as by bolts or rivets 29 extending through holes 30 provided in the outside link plates 20. The wear buttons 28 extend laterally beyond the shaft ends to engage the vertical legs 27 of the guides 25, thereby precluding contact between the shaft ends and the vertical legs.

The roll flights 11 of the conveyor are preferably spaced such that each item being conveyed rests upon at least three rolls. The coaxial arrangement of the rolls 11 and the carrier chain rollers 19 provides for the direct transfer of the vertical load on the former to the latter. Undesireable bending stresses in the carrier chain link plates 17 and 20 are thereby eliminated.

Since the principal load imposed on a roller flight conveyor is due to the weight of the material being conveyed and is, hence, a vertical load, the load on the hollow pins 21 is, likewise, primarily vertical. For maximum load bearing capacity, it is desirable that the pins be oriented, as shown, with one pair of diametrically opposed flats 31 disposed horizontally (perpendicular to the principal load). This pin orientation also assures that each pair of axially aligned pins of the corresponding carrier chains are properly positioned for receipt of the hexagonal shaft 13.

The inherent keying effect provided by the fit of the hexagonal shaft 13 in the hexagonal pin bore 23 prevents rotation of the shaft without the need for special additional anti-rotation devices. The keying effect does not require a complete matching fit as is provided between the planar surfaces of the bore 23 and the corresponding surfaces of the hexagonal shaft 13 of the preferred embodiment shown in FIGS. 1–3. Referring to FIG. 4, an alternate embodiment may include a pin 32 having a generally cylindrical bore 33 therethrough. The bore may be provided with any number of axially extending planar surfaces or flats 34 less than six. Each flat 34 is formed to correspond in dimension and location to a planar surface of the hexagonal shaft inserted in the bore 33, and one such flat would be sufficient to prevent rotation of the shaft in the bore. It will be appreciated, however, that in the alternate embodiment shown there is a substantial loss in shaft bearing area and in pin wall thickness, as would be the case in any similar embodiment with less than six flats 34 or shaft bearing surfaces within the pin bore.

What we claim is:

1. In a roller flight conveyor chain having alternate interconnected roller links and pin links, each of the former comprising a pair of roller link plates interconnected by a pair of bushings and each of the latter comprising a pair of pin link plates interconnected by a pair of cylindrical pivot pins, the improved means for providing attachment for conventional hexagonal roller flight shafts comprising axial bores in said pins dimensioned to slidably receive the hexagonal shafts and each of said bores being defined in part by at least one planar surface disposed to engage a corresponding one of the planar surfaces of a hexagonal shaft.

2. The invention of claim 1 wherein said axial bores are hexagonal.

3. In a roller flight conveyor wherein a series of rolls are rotatably mounted on hexagonal shafts and each of said shafts is in turn attached by its respective ends to a pair of carrier chains to provide therebetween a flight of the conveyor, the improved means of attaching said shafts to said chains comprising carrier chain connecting pins having hexagonal bores therethrough adapted to receive the ends of said shafts and means associated with the shaft ends for securing said shafts in said bores.

* * * * *